(12) United States Patent
Merino et al.

(10) Patent No.: US 11,173,755 B2
(45) Date of Patent: Nov. 16, 2021

(54) ADAPTER FOR A ROLLING ASSEMBLY AND ROLLING ASSEMBLY COMPRISING SAME

(71) Applicant: COMPAGNIE GENERALE DES ETABLISSEMENTS MICHELIN, Clermont-Ferrand (FR)

(72) Inventors: Jose Merino, Clermont-Ferrand (FR); Michel Ahouanto, Enval (FR); Luc Bestgen, Clermont-Ferrand (FR); Henri Hinc, Clermont-Ferrand (FR); Jacky Pineau, Clermont-Ferrand (FR); Arthur Topin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 458 days.

(21) Appl. No.: 16/098,696

(22) PCT Filed: May 4, 2017

(86) PCT No.: PCT/FR2017/051070
§ 371 (c)(1),
(2) Date: Nov. 2, 2018

(87) PCT Pub. No.: WO2017/191417
PCT Pub. Date: Nov. 9, 2017

(65) Prior Publication Data
US 2019/0135049 A1 May 9, 2019

(30) Foreign Application Priority Data

May 4, 2016 (FR) .................................... 1654068
Jun. 13, 2016 (FR) .................................... 1655413

(51) Int. Cl.
*B60C 15/02* (2006.01)
*B60B 25/12* (2006.01)
(Continued)

(52) U.S. Cl.
CPC .......... *B60C 15/0209* (2013.01); *B60B 21/10* (2013.01); *B60B 21/12* (2013.01);
(Continued)

(58) Field of Classification Search
CPC . B60C 15/0203; B60C 15/0209; B60B 21/12; B60B 21/10; B60B 25/12; B60B 25/045; B29D 2030/486
See application file for complete search history.

(56) References Cited

U.S. PATENT DOCUMENTS 3,486,547 A * 12/1969 Powers .................... B60C 3/04
152/454
4,373,567 A * 2/1983 Declercq ................ B60B 21/10
152/379.3
(Continued)

FOREIGN PATENT DOCUMENTS

FR 3026054 A1 3/2016
WO 2015091620 A1 6/2015
(Continued)

OTHER PUBLICATIONS

International Search Report dated Jul. 19, 2017, in corresponding PCT/FR2017/051070 (4 pages).
(Continued)

*Primary Examiner* — Scott A Browne
(74) *Attorney, Agent, or Firm* — Venable LLP

(57) ABSTRACT

A flexible adapter (1) for a rolling assembly, said rolling assembly comprising a tyre (2) having two beads (21), a rim (3) and two adapters (1) each intended to ensure the joint between one of the beads (21) and the rim (3), said rim (3)
(Continued)

having two rim seats (31) each extended axially outwards by a rim flange (32), the rim seat having a diameter D3, the adapter comprising an axially outer end (11) and a body (12) oriented substantially axially and disposed between said axially outer end (11) and said axially inner end (10), said body (12) having a radially outer face (121) and a radially inner face (122), having the intersection between the shoulder (111) of the axially outer end (11) of the adapter (1) and the substantially tapered face of said adapter seat (13) forming a circle of diameter D1, said adapter seat (13) having a substantially tapered face of angle $\alpha$, in which the difference "d" between the diameters D1 and D3, d=D1−D3, lies between 25.9 mm and 30.4 mm and the angle $\alpha$ is greater than 0.5°.

7 Claims, 3 Drawing Sheets

(51) Int. Cl.
*B60B 25/04* (2006.01)
*B60B 21/10* (2006.01)
*B60B 21/12* (2006.01)
*B60B 33/00* (2006.01)

(52) U.S. Cl.
CPC ............ *B60B 25/045* (2013.01); *B60B 25/12* (2013.01); *B60C 15/0203* (2013.01); *B60B 21/125* (2013.01); *B60B 33/0094* (2013.01)

(56) References Cited

U.S. PATENT DOCUMENTS

| | | | |
|---|---|---|---|
| 6,626,217 B2 * | 9/2003 | Bestgen | B60C 15/0203 152/379.4 |
| 2017/0001472 A1 | 1/2017 | Ahouanto et al. | |
| 2017/0057299 A1 | 3/2017 | Daval | |
| 2017/0291457 A1 | 10/2017 | Topin et al. | |
| 2019/0143761 A1 | 5/2019 | Ahouanto et al. | |
| 2019/0143762 A1 | 5/2019 | Barguet et al. | |

FOREIGN PATENT DOCUMENTS

| | | |
|---|---|---|
| WO | 2015165638 A1 | 11/2015 |
| WO | 2016/046197 A1 | 3/2016 |

OTHER PUBLICATIONS

French International Search Report dated Jan. 19, 2017, in corresponding FR 1654068 (2 pages).

* cited by examiner

ADAPTER FOR A ROLLING ASSEMBLY AND ROLLING ASSEMBLY COMPRISING SAME

FIELD OF THE INVENTION

The subject of the invention is an adapter for a rolling assembly intended to equip a private passenger-type vehicle. A tyre comprises two beads intended to be mounted on seats. Another subject of the invention is said rolling assembly, composed of a tyre, a rim and two adapters ensuring the link between the two beads of the tyre mounted on the seats formed on the adapter and the rim.

A tyre, a rim, and an adapter with which the present invention is concerned are usually described by a representation in a meridian plane, that is to say a plane containing the axis of rotation of the tyre. All these products (a tyre, a rim, an adapter) are objects that have a geometry of revolution relative to their axis of rotation. The radial and axial directions respectively denote the directions, the first at right angles to the axis of rotation of the tyre, and the second parallel to the axis of rotation of the tyre. Hereinbelow, the expressions "radially" and "axially" respectively mean "in a radial direction", and "in the axial direction". The expressions "radially inner, respectively radially outer" mean "closer to, respectively further away from, the axis of rotation of the tyre, in a radial direction". A median plane is a plane at right angles to the axis of rotation of the tyre, positioned axially so as to intersect the surface of the tread substantially midway between the beads of a tyre. The expressions "axially inner, respectively axially outer" mean "closer to, respectively further away from, the median plane of the tyre, in the axial direction". The expressions "radially inner, respectively radially outer" mean "closer to, respectively further away from, the axis of rotation, in the radial direction". Finally, it should also be remembered that "radial cross section" or "radial section" should be understood to mean a cross section or a section on a plane which contains the axis of rotation of the rim (and of the tyre with which the latter is equipped).

STATE OF THE ART

Generally, a tyre comprises a tread, intended to enter into contact with a ground, two side walls radially extending the axial ends of the tread inwards and two beads radially extending the two side walls inwards and intended to enter into contact with a rim.

In the document WO2016/046197, it is proposed to insert a flexible adapter between a tyre bead and a rim. The reader will refer for example to FIG. 5 of this document to learn about a rolling assembly belonging to the field of the invention. In that figure, a rolling assembly can be seen comprising a tyre, a rim and two identical adapters. Considering the language conventions reviewed above, and by referring to the manner in which such an adapter is mounted on a rim, such an adapter comprises, axially from inside to outside, an axially inner end called adapter bead and intended to ensure the attachment of the adapter on the rim. Such an adapter also comprises an axially outer end intended to receive a tyre bead. A body links the two respectively axially inner and axially outer ends.

When there is a wish to use a flexible adapter in order to increase the capacity of a rolling assembly to cross, without damage and/or with very much greater rolling comfort, potholes of great depth, for a tyre of given diameter and width (measured according to the ETRTO—European Tyre and Rim Technical Organization—standard), a rim is used with a diameter smaller than one inch and with a width smaller than what would be used to directly mount this same tyre. In most cases, two identical flexible adapters are used, as shown in FIG. 5 of the abovementioned document.

A rolling assembly, equipped with two adapters as described in the abovementioned document, ensures the main functions of a conventional rolling assembly, in which the tyre is mounted directly on its recommended rim, and also provides better endurance performance levels in use on degraded roads.

Such an adapter can be produced in reinforced elastomer material, by adopting the manufacturing technologies that are well known for tyres. In particular, the final geometry of the adapter, that is to say its dimensions and visible surfaces, are obtained by moulding in a mould in multiple parts allowing for mould-stripping, and in the case of rubber manufacturing, the mould stripping is performed after vulcanization of the rubber.

As taught by the state of the art, the control of the dimensions and of the form of the adapter is important for obtaining a good stability of the rolling assembly, therefore in particular a stable mounting of the tyre on the adapter in all rolling conditions for which this assembly is designed.

Moreover, if the industrial objective of observing all the standards of forms and of dimensions that exist for the tyres is adopted, in order to avoid destandardizing said tyres, and if the constraint of observing the standards of forms and of dimensions that exist for the rims is also adopted, in order to retain the benefit of the good grip of the mounting of an adapter on a rim, there is then a need to retain a difference of an additional inch between the diameter of the seat formed on the rim and the diameter of the tyre to form a rolling assembly as proposed in the state of the art. Thus, the adapter created according to the teaching of the state of the art comprises zones undercut in a direction parallel to the axis of rotation, which leads to complex mould-stripping.

The inventors have noted that, despite the high constraints devolving from the above objectives, it being recalled that a rolling assembly is a safety product, it is however possible to define conditions of form of the adapter which do not exhibit undercuts, make it possible to produce rolling assemblies in which there is a difference of an inch between the nominal diameter of the tyre and the nominal diameter of the seat formed on the rim, and to allow for an easy mould-stripping in a mould-stripping direction (the direction of the axis of rotation of the adapter).

BRIEF DESCRIPTION OF THE INVENTION

The subject of the invention is therefore a flexible adapter for a rolling assembly, said rolling assembly comprising a tyre having two beads, a rim and at least one adapter intended to ensure a radially flexible link between one of the beads and the rim, said rim having two rim seats, each rim seat being extended axially outwards by a rim flange, said rim seat having a diameter D3, said adapter forming a piece of revolution of axis of rotation DD', said adapter comprising an axially inner end intended to be mounted on one of said rim seats and intended to be immobilized axially against the adjacent rim flange, said adapter comprising an axially outer end and a body oriented mainly axially and disposed between said axially outer end and said axially inner end, said body having a radially outer face and a radially inner face, said axially inner end having an axially outer face substantially at right angles to the axis of rotation DD', said axially outer end forming a shoulder substantially at right angles to the axis of rotation DD', said adapter having an adapter seat intended to receive a tyre bead, said adapter seat being defined by a base and a shoulder, said shoulder being formed essentially by the axially inner face of said axially outer end, said base being formed on the radially outer face of the body, at the axially outer end thereof, the intersection between said base and said shoulder forming a circle of diameter D1, the diameter D1 being called adapter seat diameter, characterized in that the difference "d" between the diameters D1 and D3, d=D1−D3, lies between 25.9 mm and 30.4 mm.

First of all, in the interests of clarity, it is specified that the circle introduced above and to which the main claim of the present document refers, namely the circle formed by the intersection between said base and said shoulder defining the adapter seat, is generally a virtual circle formed by the axially outwards extension of said base and the radially inwards extension of said shoulder, because, in practice, the transition between said base and said shoulder is formed, in the meridian plane, by a connecting fillet. The dimension D1 is thus perfectly defined. Moreover, it can be recalled that, with regard more generally to the form of the outer surface of the axially inner end of the adapter, the person skilled in the art applies his or her general knowledge concerning the tyre beads, which leads to the choice of the dimension D3, and of other parameters allowing a correct mounting with correct grip on the rim seat. With the diameters D3 (rim seat diameter) and D1 (adapter seat diameter) being chosen by observing the rule proposed by the present invention, in the dimensioning of an adapter, the person skilled in the art then chooses the width L of the adapter.

As is known per se, the base of said adapter seat forms a substantially tapered face of angle $\alpha$, the value thereof being mainly the consequence of the choices of values for the diameters D1, D3 and the width L of the adapter, said width being measured between the axially inner face of the axially outer end and the axially outer face of the axially inner end of said adapter. Advantageously, the angle $\alpha$ lies between 0.5° and 10°, and preferentially lies between 5° and 8°. Advantageously, said width L lies between 35 and 45 mm.

The invention then brings a notable improvement to the manufacturing process through easier mould-stripping of the adapter, due to the absence of undercut, through the adoption of angle $\alpha$ values that are unconventional, greater than in the embodiments known from the state of the art. Furthermore, it has been found that the invention also allows for an excellent grip of the tyre on the adapter, because an adapter designed in this way provides significant gripping pressures between tyre bead and adapter seat. This advantage is of interest because it provides for excellent so-called anti-unseating performance, without the need for additional components to increase the gripping pressures on the beads of the tyre.

DESCRIPTION OF THE FIGURES

The invention is described hereinbelow using FIGS. 1 to 3, not necessarily to scale and given purely by way of illustration.

DETAILED DESCRIPTION OF THE INVENTION

Figure 1:
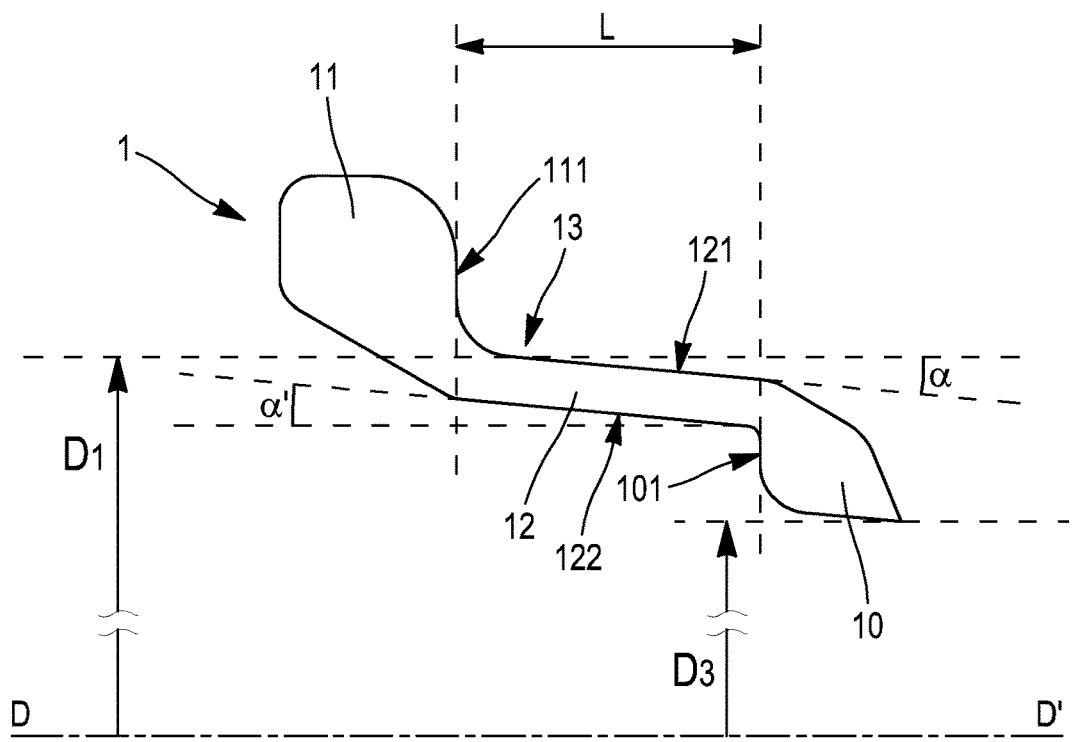
FIG. 1 is a radial cross section of an adapter according to the invention, not mounted.

FIG. 1 represents a radial cross section of an adapter 1 according to the invention. It comprises an axially inner end 10 intended to be mounted on one of said rim seats. It comprises an axially outer end 11 and a body 12 oriented substantially axially and disposed between said axially outer end 11 and said axially inner end 10. The body 12 has a radially outer face 121 and a radially inner face 122; said axially inner end 10 has an axially inner face 101 substantially at right angles to the axis of rotation DD'; said axially outer end 11 has a shoulder 111 partly forming a face substantially at right angles to the axis of rotation DD'. The body 12 has a width L measured between the axially inner face 101 and the axially outer face 111. Said adapter 1 comprises an adapter seat 13, defined by a base 131 and a shoulder 111. It can be seen that the shoulder 111 is formed essentially by the axially inner face of said axially outer end 11, and that the base 131 is formed on the radially outer face 121 of the body 12, at the axially outer end thereof.

The base 131 forms a substantially tapered face of angle $\alpha$. On a radial cross section of the adapter according to the invention, such as that of FIG. 2, by extending the line of the shoulder 111 from the axially outer end 11 radially inwards and by extending the line of the substantially tapered face of the base 131 axially outwards, a point P1 is obtained which is the line of a circle of diameter D1 (by convention, FIGS. 1 and 2 always show half-diameters). In the same FIG. 2, a point P0 can be seen corresponding to the diameter D0 which, itself, corresponds to the diameter of the tyre of the rolling assembly using the adapter 1 according to the invention. A dimension "a" is also read which is the half-difference between the diameters D1 and D0.

Preferentially, the difference "d" between the diameters D1 and D3, d=D1−D3, lies between 27.8 mm and 30 mm. Generally, the angle $\alpha$ is greater than 0.5° (that is to say ½ degree of angle, or 30 minutes of angle) and is less than 10°; preferably, the angle $\alpha$ is greater than 1°, and even more advantageously, the angle $\alpha$ lies between $2.5<\alpha<6°$.

Advantageously, the radially inner face 121 being a substantially tapered face of angle $\alpha'$, the adapter 1 according to the invention is such that the difference between the angle $\alpha$ and the angle $\alpha'$ is less than 2°. Preferably, the angle $\alpha'$ is identical to the angle $\alpha$.

In the example illustrating the invention, the width L of the adapter is approximately 38 mm and the difference D1−D3 is 28 mm. With the adapter being produced in such a way that it is flexible (for example in elastomer material reinforced by bead wires and one or more reinforcing layers formed by an arrangement of cables parallel to the axis of rotation, technical means well known to the person skilled in the art in the tyre field), the minimum width should be sufficient for, when the tyre, adapter and rim assembly is mounted, ready to operate, the bead of the tyre to be axially outside the rim flange, to allow the radial displacement of the bead of the tyre mounted on the adapter seat.

Now for a more detailed look at how to construct a profile, seen in meridian cross section, of an adapter according to the invention. The ETRTO standards giving the rim seat diameters, an extract of which is given in the table below, are used as the basis:

| DIAMETERS - CODE 10 to 28 on 5° DROP-CENTRE RIMS | |
|---|---|
| NOMINAL DIAMETER CODE | SPECIFIED DIAMETER D (mm) |
| 10 | 253.2 |
| 12 | 304.0 |
| 13 | 329.4 |
| 14 | 354.8 |
| 15 | 380.2 |
| 16 | 405.6 |
| 17 | 436.6 |
| 18 | 462.0 |
| 19 | 487.4 |
| 20 | 512.8 |
| 21 | 538.2 |
| 22 | 563.6 |
| 23 | 589.0 |
| 24 | 614.4 |
| 25 | 639.8 |
| 26 | 665.2 |
| 28 | 716.0 |

Figure 2:
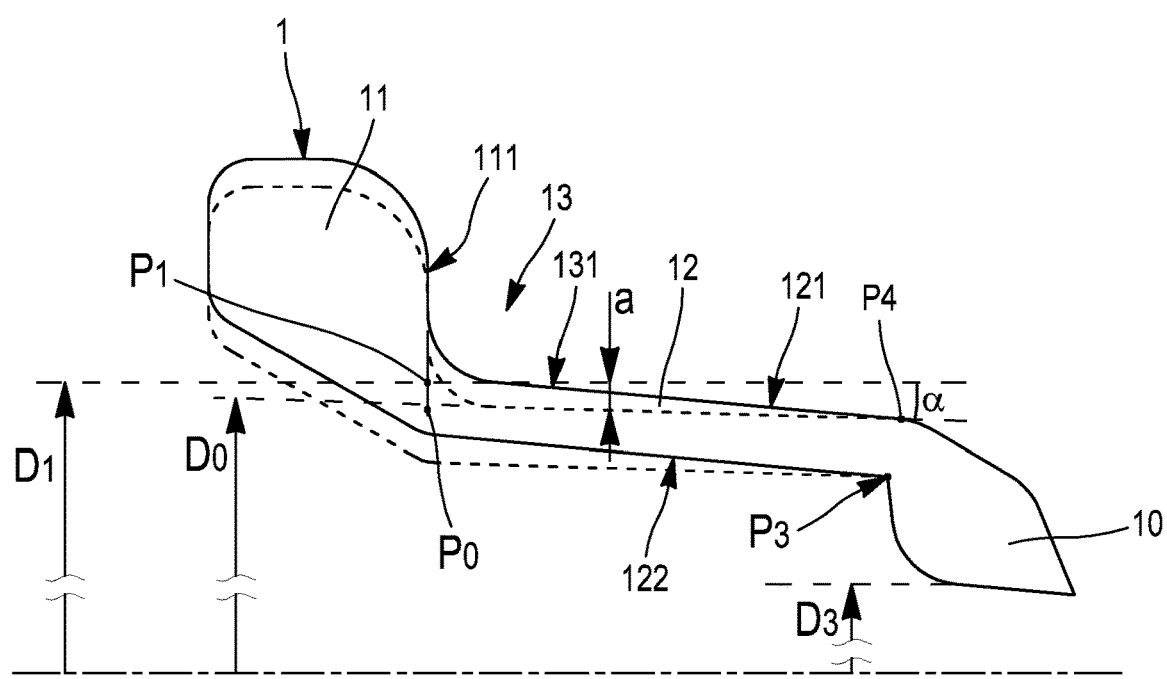
FIG. 2 is a radial cross section of an adapter according to the invention, not mounted, overlaid on an adapter according to the state of the art.

FIG. 2 shows, by solid line, an adapter according to the invention, and, by discontinuous line, overlaid on the adapter according to the invention, an adapter according to the state of the art and which is directly comparable to it, that is to say designed to receive one and the same tyre and to be mounted on one and the same rim, as for example illustrated in FIG. 5 of the abovementioned patent application WO2016/46197. In the example of the invention, the aim is to use a tyre 2 whose seat diameter is 18' and a rim 3 whose rim seat diameter 31 is 17' (see FIG. 4). FIG. 2 shows the point P0 at the intersection of the extension of the shoulder 111 and of the extension of the (tapered) base of the adapter seat of the state of the art, or, equivalently, of the rim seat which would be of diameter D0 of value 18'. Having marked the point P0, on a radial straight line including the point P0, the point P1 situated at a radius that is higher by the value "a" is determined. This point establishes an adapter seat 13 diameter of value D1=D0+2a, with a lying between 0.5 mm and 5 mm. The axially inner end 10 of the adapter 1 is for example of diameter D3 of value 17' and the axially outer end 11 of the adapter 1 is for example of diameter D1 of value 18'+4 mm. The dimension "a" represents the increase of the half-diameter of the adapter seat 13 of the adapter 1 relative to the half-diameter D1 of the tyre that is mounted on such an adapter. From this raised point of the dimension "a", and given the thickness of the adapter 1 under the adapter seat 13, the profile of the radially inner face 122 (see FIG. 1), more particularly the angle a' (see FIG. 1), is adjusted to meet the profile of an adapter according to the state of the art substantially at the point P3, that is to say at the point where the body 12 meets the axially inner end 10 of the adapter. Similarly, the profile of the radially outer face 121, more particularly the angle a, is adjusted to meet the profile of an adapter according to the state of the art at the point P4, that is to say the point where when the body 12 meets the axially inner end 10.

Figure 3:
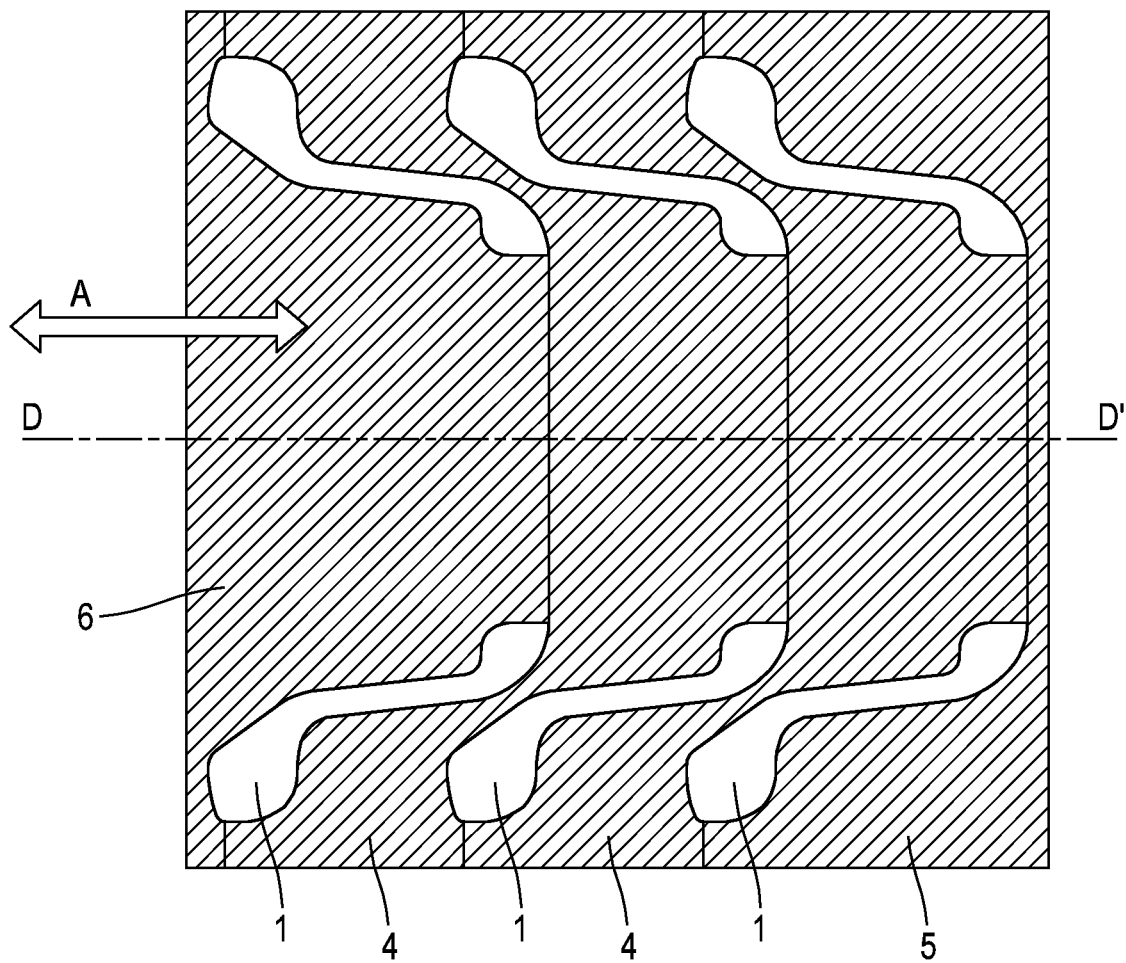
FIG. 3 is a radial cross section of a mould allowing for the moulding of three adapters according to the invention.

In FIG. 3, a mould can be seen composed of several parts 4, 5, 6 which can be moved in one and the same direction A parallel to the axis DD'. This mould makes it possible to simultaneously mould three adapters 1 according to the invention, with ease of mould-stripping ensured by the value of the angles angle α and α'.

The mounting of an adapter 1 according to the invention is similar to the mounting of an adapter known from the state of the art. Once the mounting has been done, the bead 21 of the tyre 2 imposes a circumferential contraction on the adapter 1 according to the invention. The latter is therefore in the same configuration as that illustrated for example in FIG. 5 of the abovementioned patent application WO2016/46197. As an example, for a tyre 245/40-18 (that is to say of diameter D1=18 inches), associated with a rim 6B17 (that is to say of 6-inch width, hook B, 17-inch diameter, according to the ETRTO standard), two adapters 1 are used, of which the adapter seat 13 diameter is 18 inches+7 mm (measured at the intersection of the profile of the radially outer face 121 and of the shoulder 111) and a width L=35.5 mm.

Figure 4:
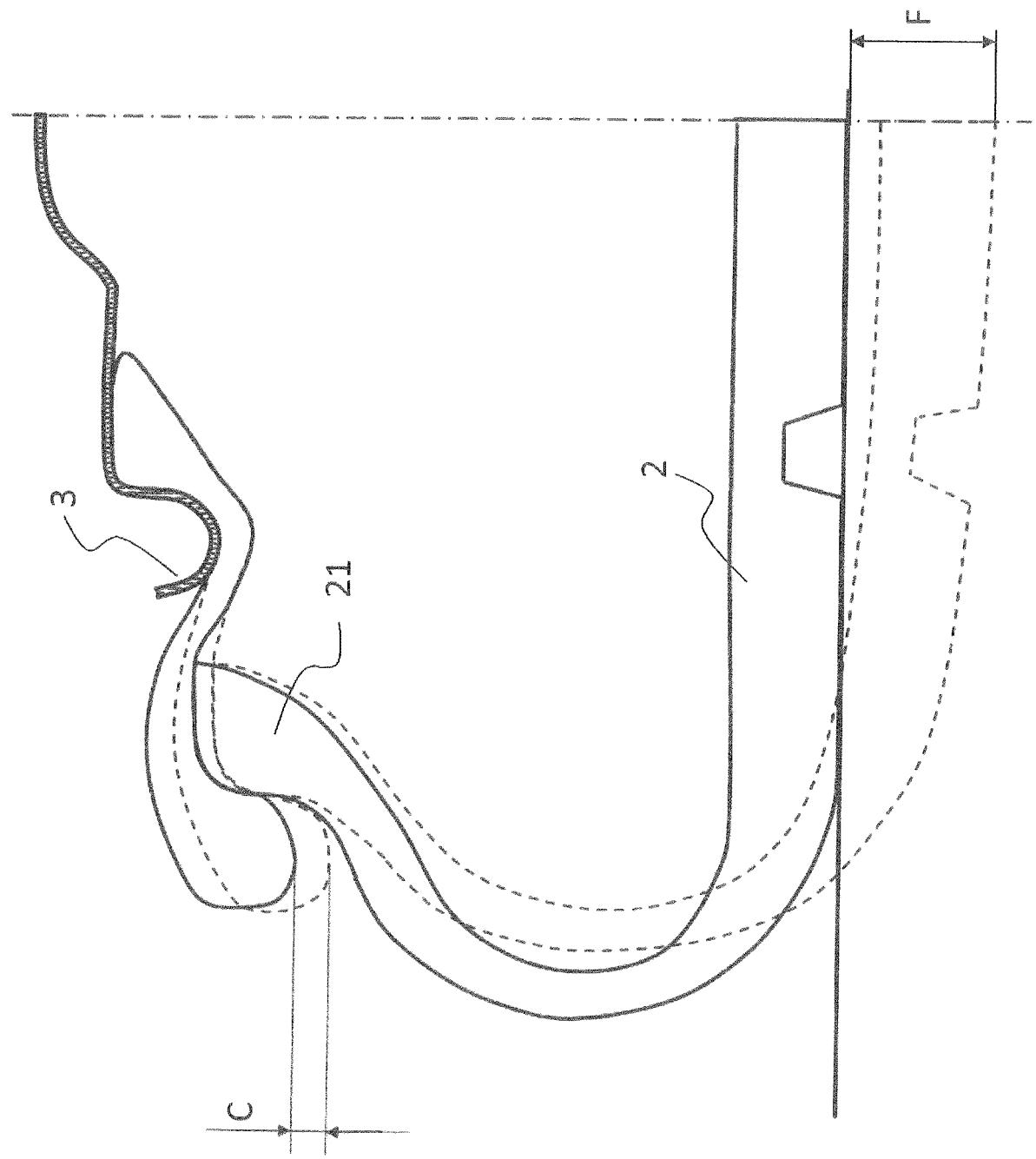
FIG. 4 is a half radial cross section of an assembly according to the invention, with change of form due to the loading.

FIG. 4 recalls, by discontinuous line, the form of an assembly according to the invention in mounted position, inflated and without deformations other than those resulting from the inflation pressure, and by solid line the same assembly crushed under nominal loading. It has been seen that the invention relates to flexible adapters. It is understood thereby that it allows, in the radial direction, a clearance between the bead 21 of the tyre 2 and the rim 3 of at least 5% (see clearance C in FIG. 4) of the deflection (see value F in FIG. 4) of the tyre 2 crushed at recommended loading and pressure. In normal operation, these (elastic) deformations are cancelled if the stresses or forces which are the cause thereof are eliminated.

In most of the implementations of the invention, said rolling assembly comprises a tyre and two adapters each intended to ensure the join between one of the beads and the rim; the two adapters are identical, which means that it is sufficient to show and describe just one thereof. The invention also extends to a rolling assembly comprising a tyre 2 having two beads 21, a rim 3 and at least one adapter 1 intended to ensure the join between one of the beads 21 and the rim 3, the tyre bead having a diameter D0, said rim 3 having two rim seats 31, each rim seat 31 being extended axially outwards by a rim flange 32, said rim seat having a diameter D3, said adapter forming a piece of revolution of axis of rotation DD', said adapter comprising an axially inner end 10 intended to be mounted on one of said rim seats and intended to be immobilized axially against the adjacent rim flange 32, said adapter comprising an axially outer end 11 and a body 12 oriented mainly axially and disposed between said axially outer end 11 and said axially inner end 10, said body 12 having a radially outer face 121 and a radially inner face 122, said axially inner end 10 having an axially outer face 101 substantially at right angles to the axis of rotation DD', said adapter having an adapter seat 13 intended to receive a tyre bead, said adapter seat 13 being defined by a base 131 and a shoulder 111, said shoulder 111 being formed essentially by the axially inner face of said axially outer end 11, said base 131 being formed on the radially outer face 121 of the body 12, at the axially outer end thereof, the intersection between said base 131 and said shoulder 111 forming a circle of diameter D1, characterized in that the difference "d" between the diameters D1 and D3, d=D1−D3, lies between 25.9 mm and 30.4 mm. All the features indicated above, to specify certain aspects and explain advantageous or preferred variants of the adapter, are of course applicable when the adapter is an element of the rolling assembly targeted in this paragraph.

The invention claimed is:

1. A flexible adapter for a rolling assembly, the rolling assembly comprising a tire having two beads, a rim and at least one adapter intended to ensure a radially flexible link between one of the beads and the rim, the rim having two rim seats, each rim seat being extended axially outwards by a rim flange, and the rim seat having a diameter D3,
wherein a shape of the adapter is configured to have symmetry of revolution about an axis of rotation, wherein the adapter comprises:
an axially inner end intended to be mounted on one of the rim seats and intended to be immobilized axially against an adjacent rim flange;
an axially outer end;
a body oriented mainly axially and disposed between the axially outer end and the axially inner end, the body having a radially outer face and a radially inner face, and the axially inner end having an axially outer face substantially at right angles to the axis of rotation; and
an adapter seat intended to receive a tire bead, the adapter seat being defined by a base and a shoulder, the shoulder being formed essentially by an axially inner face of said axially outer end, said base being formed on the radially outer face of the body, at the axially outer end thereof, the intersection between the base and the shoulder forming a circle of diameter $D_1$, the diameter $D_1$ being called adapter seat diameter,
wherein the difference d between the diameters $D_1$ and $D_3$ lies between 25.9 mm and 30.4 mm, and
wherein the width measured between the shoulder of the axially outer end and the axially outer face of the axially inner end is between 35 and 45 mm.

2. The flexible adapter according to claim 1, wherein the difference d between the diameters $D_1$ and $D_3$ is between 27.8 mm and 30 mm.

3. The flexible adapter according to claim 1, wherein the radially outer face is a substantially tapered face of angle $\alpha$, which lies between 5° and 8°.

4. The flexible adapter according to claim 3, wherein the radially inner face is a substantially tapered face of angle $\alpha'$, and
wherein the difference between the angle $\alpha$ and the angle $\alpha'$ is less than 2°.

5. The flexible adapter according to claim 4, wherein the angle $\alpha'$ is identical to the angle $\alpha$.

6. The flexible adapter according to claim 1, wherein the shoulder is substantially at right angles to the axis of rotation.

7. A rolling assembly comprising a tire having two beads, a rim, and at least one flexible adapter intended to ensure the joint between one of the beads and the rim, the tire bead having a diameter $D_0$, the rim having two rim seats, each rim seat being extended axially outwards by a rim flange, and the rim seat having a diameter $D_3$,
wherein a shape of the adapter is configured to have symmetry of revolution about an axis of rotation,
wherein the adapter comprises:
an axially inner end intended to be mounted on one of the rim seats and intended to be immobilized axially against an adjacent rim flange;
an axially outer end;
a body oriented mainly axially and disposed between the axially outer end and the axially inner end, the body having a radially outer face and a radially inner face, and the axially inner end having an axially outer face substantially at right angles to the axis of rotation; and
an adapter seat intended to receive a tire bead, the adapter seat being defined by a base and a shoulder, the shoulder being formed essentially by an axially inner face of said axially outer end, said base being formed on the radially outer face of the body, at the axially outer end thereof, the intersection between the base and the shoulder forming a circle of diameter $D_1$, the diameter $D_1$ being called adapter seat diameter,
wherein the difference d between the diameters $D_1$ and $D_3$ lies between 25.9 mm and 30.4 mm, and
wherein the width measured between the shoulder of the axially outer end and the axially outer face of the axially inner end is between 35 and 45 mm.

* * * * *